United States Patent
Wang et al.

(10) Patent No.: US 9,497,816 B2
(45) Date of Patent: Nov. 15, 2016

(54) METHOD FOR MINIMIZING LED FLICKER OF AN LED DRIVER SYSTEM

(71) Applicant: Chipone Technology (Beijing) Co., Ltd., Beijing (CN)

(72) Inventors: Yen-Hui Wang, Hsinchu (TW); Chi-Jung Wang, Hsinchu (TW)

(73) Assignee: CHIPONE TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 14/534,542

(22) Filed: Nov. 6, 2014

(65) Prior Publication Data

US 2016/0135258 A1 May 12, 2016

(51) Int. Cl.
*H05B 33/08* (2006.01)

(52) U.S. Cl.
CPC ...... *H05B 33/0845* (2013.01); *H05B 33/0815* (2013.01); *H05B 33/0824* (2013.01); *H05B 33/0803* (2013.01)

(58) Field of Classification Search
CPC ........................ H05B 33/0815; H05B 33/0845
See application file for complete search history.

(56) References Cited

U.S. PATENT DOCUMENTS

| | | | | |
|---|---|---|---|---|
| 8,288,953 | B1* | 10/2012 | Mei | H05B 33/0815 315/209 R |
| 2006/0202637 | A1* | 9/2006 | Chiang | H05B 33/0827 315/291 |
| 2006/0232226 | A1* | 10/2006 | Ortiz | H02M 1/4225 315/291 |
| 2008/0068298 | A1* | 3/2008 | Shen | G09G 3/14 345/46 |
| 2010/0066270 | A1* | 3/2010 | Yang | H05B 33/0851 315/309 |
| 2012/0181946 | A1* | 7/2012 | Melanson | H03K 17/18 315/247 |
| 2012/0306404 | A1* | 12/2012 | Lo | H05B 33/083 315/291 |
| 2014/0001968 | A1* | 1/2014 | Sun | H05B 33/0845 315/186 |
| 2014/0354186 | A1* | 12/2014 | Sun | H05B 33/0815 315/310 |
| 2015/0145424 | A1* | 5/2015 | Zhang | G02F 1/133603 315/185 R |

* cited by examiner

*Primary Examiner* — Tung X Le
*Assistant Examiner* — Raymond R Chai
(74) *Attorney, Agent, or Firm* — Muncy, Geissler, Olds & Lowe, P.C.

(57) ABSTRACT

A method for minimizing LED flicker of an LED driver system, the LED driver system comprising a PFC constant average current converter, a capacitor, an LED module, and a current regulator, the method including: a first step: the current regulator generating a control voltage according to an average of a difference between a reference voltage and a voltage at a second end of the LED module; and a second step: the current regulator determining a regulation value for a current flowing through the LED module according to the control voltage.

5 Claims, 5 Drawing Sheets

METHOD FOR MINIMIZING LED FLICKER OF AN LED DRIVER SYSTEM

BACKGROUND OF THE INVENTION

Field of the Invention

The present invention relates to an LED (light emitting diode) driving method, especially to a method for minimizing LED flicker of an LED driver system.

Description of the Related Art

Please refer to FIG. 1, which illustrates a circuit diagram of a prior art LED driver circuit. As illustrated in FIG. 1, the prior art LED driver circuit includes a bridge rectifier 10, a PFC constant average current converter 11, a capacitor 12, an LED module 13, an NMOS (n type metal oxide semiconductor) transistor 14, an amplifier 15, and a current-setting resistor 16.

The bridge rectifier 10 is used to generate a full-wave-rectified voltage $V_{IN}$ according to an AC power $V_{AC}$.

The PFC (power factor correction) constant average current converter 11 is coupled with the bridge rectifier 10 to make an input current $I_{IN}$ in phase with the full-wave-rectified voltage $V_{IN}$, and generate an output voltage $V_{OUT}$ and an output current $I_{OUT}$, which are both in phase with the full-wave-rectified voltage $V_{IN}$, and the output current $I_{OUT}$ has a constant average value.

The capacitor 12 is coupled between the PFC constant average current converter 11 and a ground for bypassing a ripple current $I_C$.

The LED module 13 has a first end coupled with the PFC constant average current converter 11 and a second end coupled with the NMOS transistor 14 to let a load current $I_{LED}$ flow through, wherein $I_{LED}=I_{OUT}-I_C$.

The NMOS transistor 14, the amplifier 15, and the current-setting resistor 16 form a current regulator, wherein the NMOS transistor 14 has a drain coupled with the second end of the LED module 13, a gate coupled with the amplifier 15, and a source coupled with the current-setting resistor 16; the amplifier 15 has a positive input end coupled with a constant reference voltage $V_{REF}$, a negative input end coupled with the source of the NMOS transistor 14, and an output end coupled with the gate of the NMOS transistor 14; and the current-setting resistor 16 is coupled between the source of the NMOS transistor 14 and the ground.

The current regulator is designed to regulate a current flowing through the current-setting resistor 16 to a constant current of $V_{REF}$/(the resistance of the current-setting resistor 16). As the current-setting resistor 16 is in the same current path with the LED module 13, therefore, the constant current set by the current regulator has to be equal to the constant average value of the output current $I_{OUT}$. If the constant current set by the current regulator is higher than the constant average value of the output current $I_{OUT}$, the NMOS transistor 14 will be operating in a triode region, causing a ripple current to flow in the LED module 13, and thereby result in a flicker phenomenon. On the other hand, if the constant current set by the current regulator is lower than the constant average value of the output current $I_{OUT}$, an excess current will flow through the capacitor 12 to lift up the level of the output voltage $V_{OUT}$, which can result in an overheat hazard of the driver system.

However, as general resistors have a variance in resistance, the current-setting resistor 16 can therefore cause a mismatch between the constant current set by the current regulator and the constant average value of the output current $I_{OUT}$, and thereby cause the problems mentioned above. To avoid the problems, the current-setting resistor 16 can use a precise resistor. However, the cost will be much higher. Besides, when a variety of different constant average values of the output current $I_{OUT}$ are required (so as to provide a dimming function, for example), the setting of the current regulator will have to be changed accordingly, which can cause much inconvenience to the manufacturer.

To solve the foregoing problems, a novel LED driving method is needed.

SUMMARY OF THE INVENTION

One objective of the present invention is to disclose a method for minimizing LED flicker of an LED driver system, which is capable of automatically adjusting a regulation current of a current regulator to an average value of a full-wave-rectified output current of a PFC constant current converter, so as to minimize the ripple of a current flowing through an LED module and thereby eliminate the flicker of the LED module.

Another objective of the present invention is to disclose a method for minimizing LED flicker of an LED driver system, which is capable of making a regulation current equal to an average value of a full-wave-rectified output current of a PFC constant current converter without the need of using a precise current-setting resistor.

To attain the foregoing objectives, a method for minimizing LED flicker of an LED driver system is proposed, the LED driver system comprising a PFC constant average current converter, a capacitor, an LED module, and a current regulator, wherein the PFC constant average current converter has an input coupled to a full-wave-rectified input voltage and an output providing an output voltage and an output current, both the output voltage and the output current being in phase with the full-wave-rectified input voltage, and the output current having a constant average value; the capacitor is coupled between the output of the PFC constant average current converter and a ground; the LED module has a first end coupled to the output of the PFC constant average current converter and a second end coupled to the current regulator; and the current regulator is coupled between the second end of the LED module and the ground, the method including:

a first step: the current regulator generating a control voltage according to an average of a difference between a reference voltage and a voltage at the second end of the LED module; and a second step: the current regulator determining a regulation value for a current flowing through the LED module according to the control voltage.

In one embodiment, the current regulator uses an NMOS transistor, a resistor, and an amplifier to determine the regulation value in the second step.

In one embodiment, the current regulator uses an NMOS transistor, a resistor, an amplifier, and a current mirror to determine the regulation value in the second step.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 1:
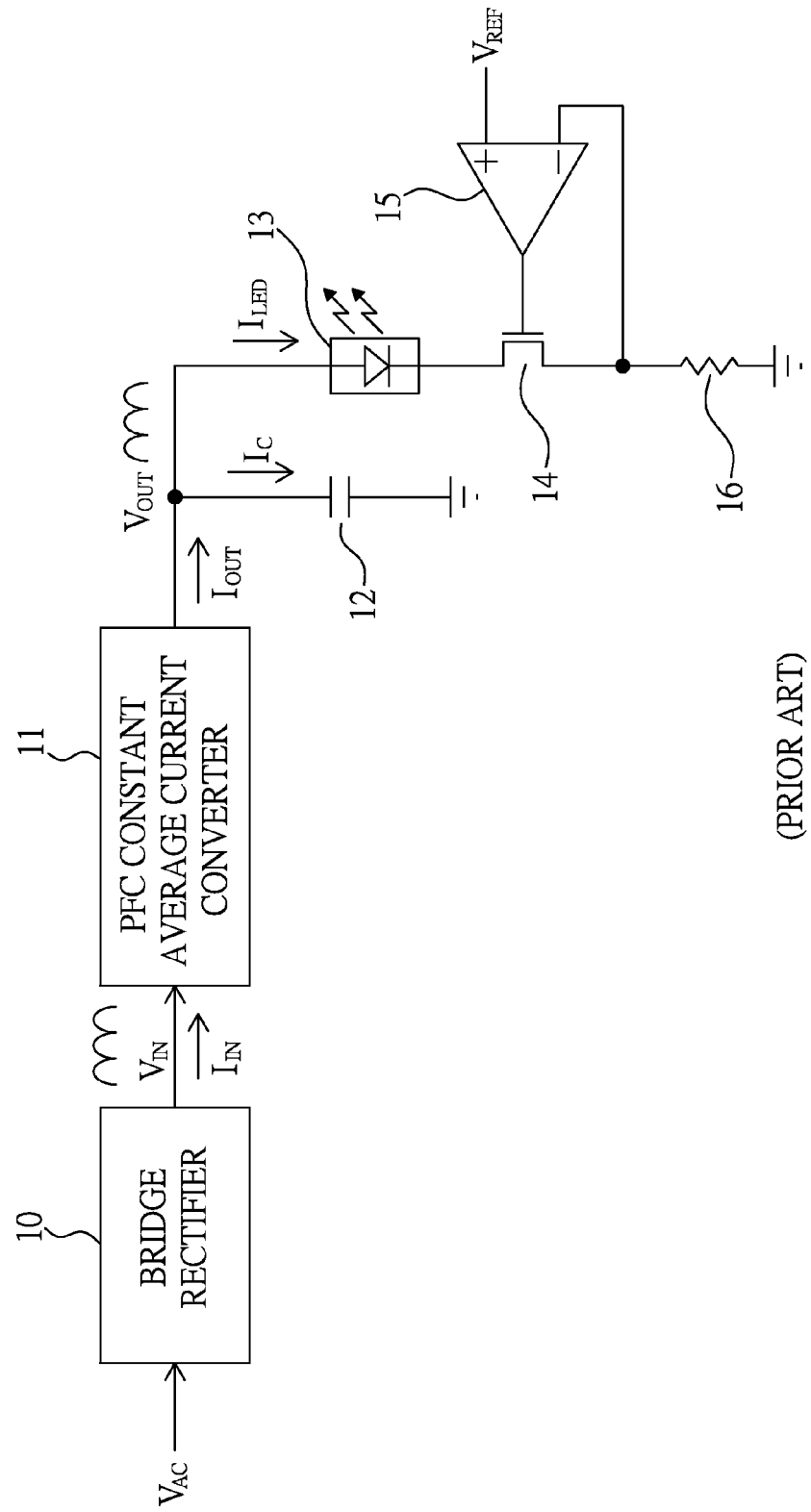
FIG. 1 illustrates a circuit diagram of a prior art LED driver circuit.
Figure 2:
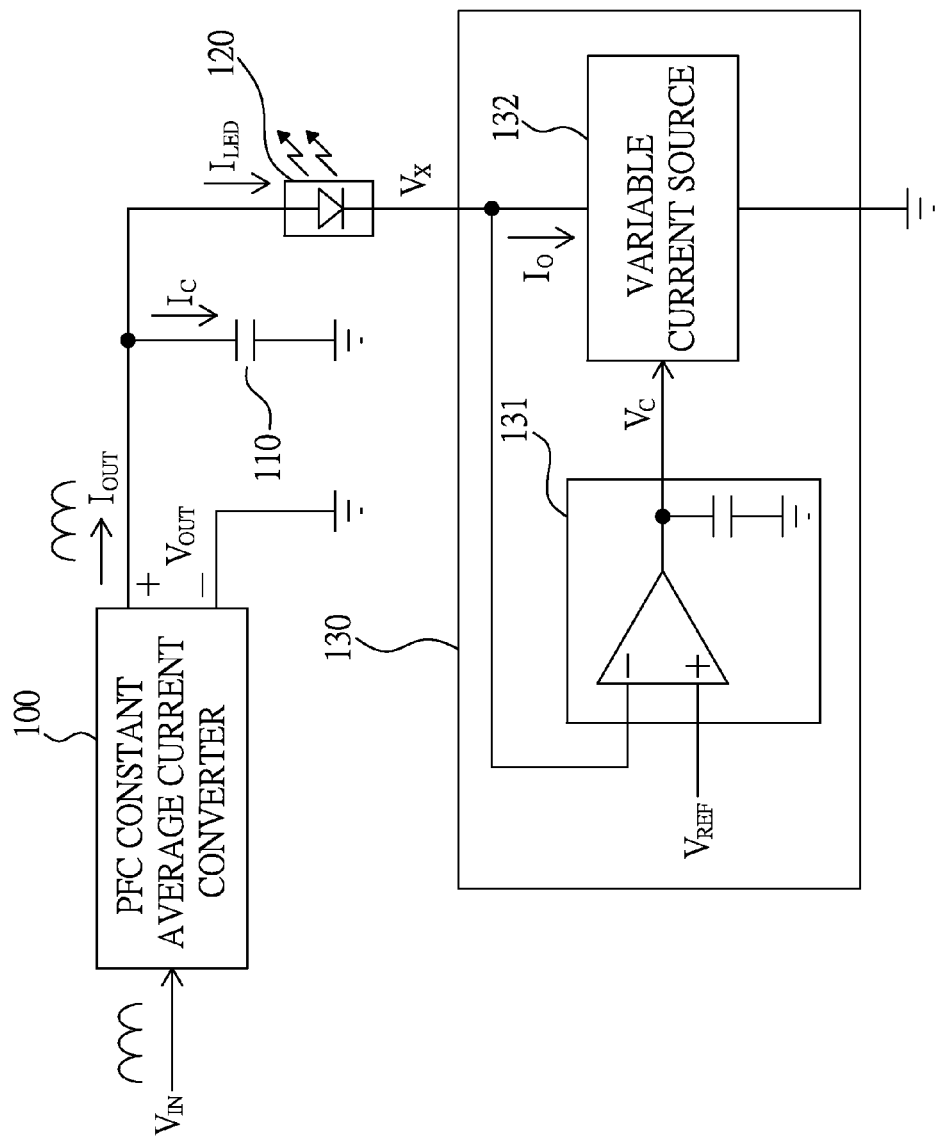
FIG. 2 illustrates a circuit diagram of an LED driver system using a flicker elimination method of the present invention.

Please refer to FIG. 2, which illustrates a circuit diagram of an LED driver system using a flicker elimination method of the present invention. As illustrated in FIG. 2, the LED driver system includes a PFC constant average current converter 100, a capacitor 110, an LED module 120, and a current regulator 130.

The PFC constant average current converter 100 has an input coupled to a full-wave-rectified input voltage $V_{IN}$ and an output providing an output voltage $V_{OUT}$ and an output current $I_{OUT}$, both the output voltage $V_{OUT}$ and the output current $I_{OUT}$ being in phase with the full-wave-rectified input voltage $V_{IN}$, and the output current $I_{OUT}$ having a constant average value.

The capacitor 110 is coupled between the output of the PFC constant average current converter 100 and a ground to let a current $I_C$ flow through.

The LED module 120 has a first end coupled to the output of the PFC constant average current converter 100 and a second end coupled to the current regulator 130 to let a current $I_{LED}$ flow through, wherein $I_{LED}=I_{OUT}-I_C$.

The current regulator 130 is coupled between the second end of the LED module 130 and the ground to perform a regulation function which automatically adjusts a regulation current $I_O$ to the constant average value of the output current $I_{OUT}$ according to a voltage $V_X$ at the second end of the LED module 120. The current regulator 130 includes a control voltage generation circuit 131 and a variable current source 132 to perform the regulation function by: a) the control voltage generation circuit 131 generating a control voltage $V_C$ according to an average of a difference between a reference voltage $V_{REF}$ and a voltage $V_X$ at the second end of the LED module 120; and b) the variable current source 132 determining a regulation current $I_O$ according to the control voltage $V_C$.

During the operation of the regulation function, when the regulation current $I_O$ is higher than the constant average value of the output current $I_{OUT}$, the variable current source 132 will enter a linear region to pull down the voltage $V_X$, causing the control voltage generation circuit 131 to lift up the control voltage $V_C$, and thereby reduce the regulation current $I_O$; and when the regulation current $I_O$ is lower than the constant average value of the output current $I_{OUT}$, the level of the voltage $V_X$ will shift upward, causing the control voltage generation circuit 131 to pull down the control voltage $V_C$, and thereby increase the regulation current $I_O$. With this mechanism of the regulation function, the regulation current $I_O$ will be automatically adjusted to the constant average value of the output current $I_{OUT}$.

Figure 3:
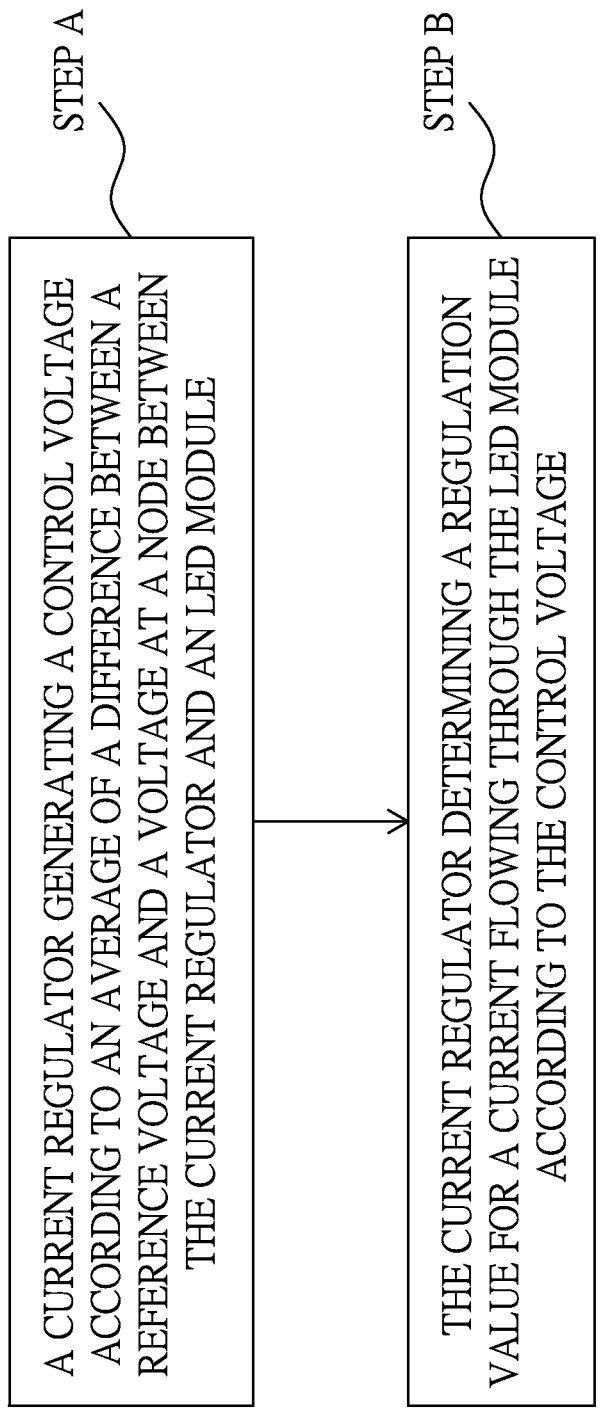
FIG. 3 illustrates a flowchart of a preferred embodiment of the method of the present invention.

Therefore, as illustrated in FIG. 3, the method of the present invention mainly includes two steps: a current regulator generating a control voltage according to an average of a difference between a reference voltage and a voltage at a node between the current regulator and an LED module (step a); and the current regulator determining a regulation value for a current flowing through the LED module according to the control voltage (step b). With this arrangement, the current regulator can adaptively adjust a regulation current to meet a required constant average value of the output current of a PFC constant average current converter, so as to minimize the ripple of the current flowing through the LED module, and thereby eliminate the flicker of the LED module.

Figure 4:
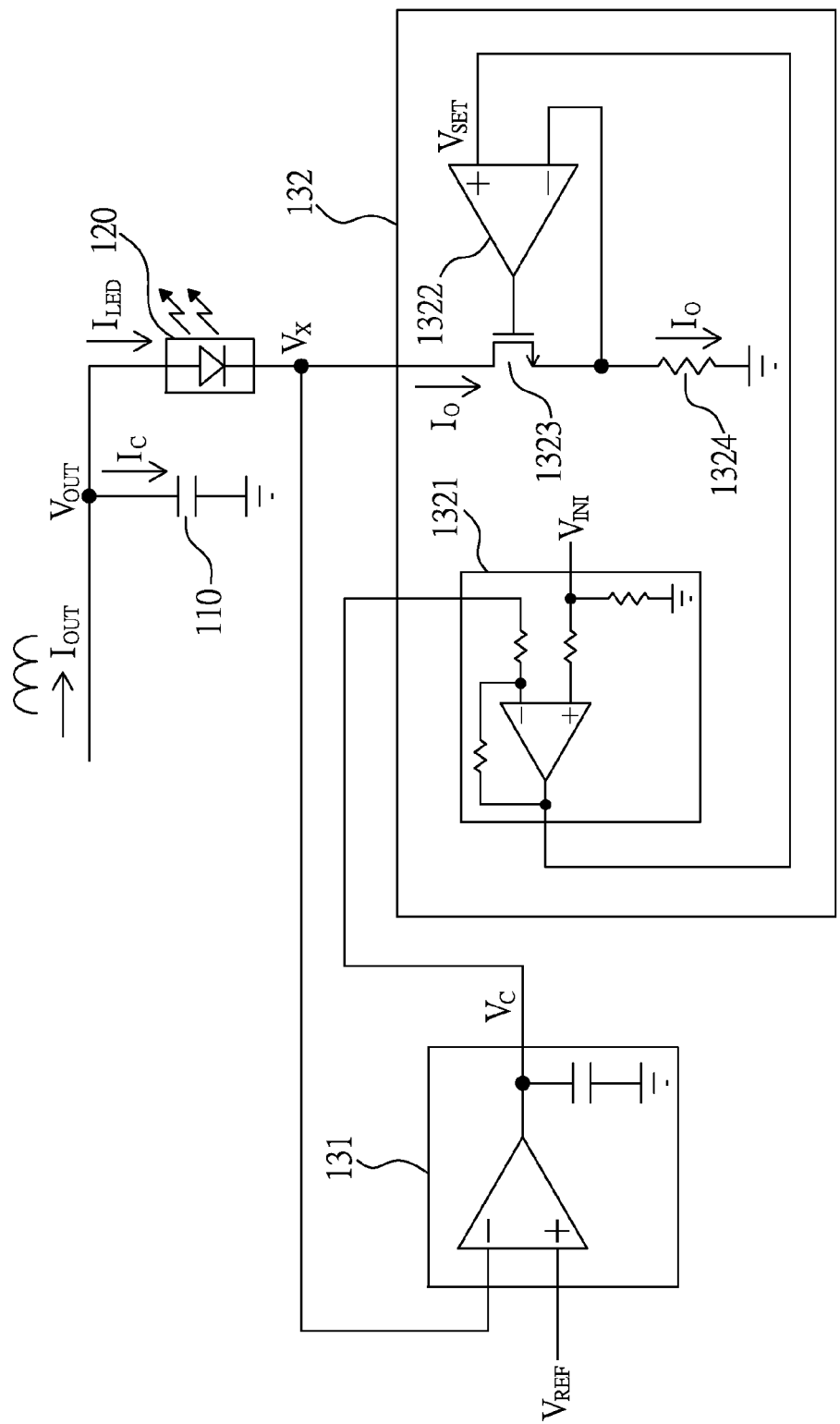
FIG. 4 illustrates a circuit diagram of a preferred embodiment of the current regulator required by the method of the present invention.

Please refer to FIG. 4, which illustrates a circuit diagram of a preferred embodiment of the current regulator required by the method of the present invention. As illustrated in FIG. 4, the current regulator includes a control voltage generation circuit 131, a difference amplifier circuit 1321, an amplifier 1322, an NMOS transistor 1323, and a current-setting resistor 1324, wherein the difference amplifier circuit 1321, the amplifier 1322, the NMOS transistor 1323, and the current-setting resistor 1324 act together as the variable current source 132.

When the regulation current $I_O$ is higher than the constant average value of the output current $I_{OUT}$ from the PFC constant average current converter 100, the NMOS transistor 1323 will enter a linear region to pull down the voltage $V_X$, causing the control voltage generation circuit 131 to lift up the control voltage $V_C$, which will lower the level of an output voltage $V_{SET}$ of the difference amplifier circuit 1321 based on an initial voltage $V_{INI}$, and then the amplifier 1322, the NMOS transistor 1323, and the current-setting resistor 1324 will act in response to decrease the regulation current $I_O$; and when the regulation current $I_O$ is lower than the constant average value of the output current $I_{OUT}$, the level of the voltage $V_X$ will shift upward, causing the control voltage generation circuit 131 to pull down the control voltage $V_C$, which will shift up the level of the output voltage $V_{SET}$ of the difference amplifier circuit 1321, and then the amplifier 1322, the NMOS transistor 1323, and the current-setting resistor 1324 will act in response to increase the regulation current $I_O$. As a result, even the current-setting resistor 1324 has a variance in resistance, the regulation current $I_O$ still can be automatically adjusted to the constant average value of the output current $I_{OUT}$.

Figure 5:
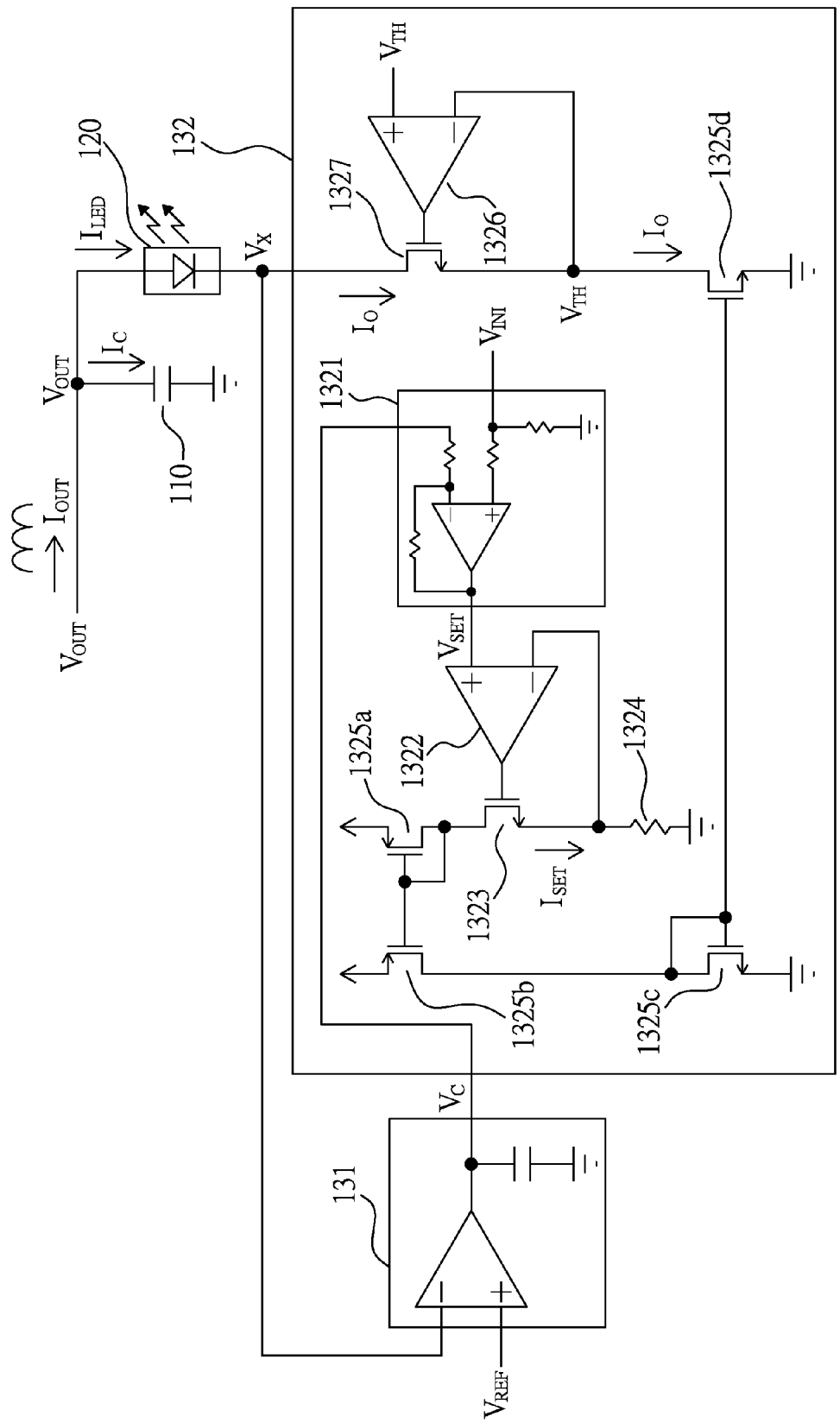
FIG. 5 illustrates a circuit diagram of another preferred embodiment of the current regulator required by the method of the present invention.

Please refer to FIG. 5, which illustrates a circuit diagram of another preferred embodiment of the current regulator required by the method of the present invention. As illustrated in FIG. 5, the current regulator includes a control voltage generation circuit 131, a difference amplifier circuit 1321, an amplifier 1322, an NMOS transistor 1323, a current-setting resistor 1324, a pair of PMOS transistors 1325a-1325b, a pair of NMOS transistors 1325c-1325d, an amplifier 1326, and an NMOS transistor 1327, wherein the pair of PMOS transistors 1325a-1325b and the pair of NMOS transistors 1325c-1325d act together as a current mirror, and the difference amplifier circuit 1321, the amplifier 1322, the NMOS transistor 1323, the current-setting resistor 1324, the pair of PMOS transistors 1325a-1325b, the pair of NMOS transistors 1325c-1325d, the amplifier 1326, and the NMOS transistor 1327 act together as the variable current source 132.

When the regulation current $I_O$ is higher than the constant average value of the output current $I_{OUT}$ from the PFC constant average current converter 100, the NMOS transistor 1323 will enter a linear region to pull down the voltage $V_X$, causing the control voltage generation circuit 131 to lift up the control voltage $V_C$, which will lower the level of an output voltage $V_{SET}$ of the difference amplifier circuit 1321 based on an initial voltage $V_{INI}$, and then the amplifier 1322, the NMOS transistor 1323, and the current-setting resistor 1324 will act in response to decrease a current $I_{SET}$, which will decrease the regulation current $I_O$ via the action of the current mirror, the amplifier 1326, and the NMOS transistor 1327; and when the regulation current $I_O$ is lower than the constant average value of the output current $I_{OUT}$, the level of the voltage $V_X$ will shift upward, causing the control voltage generation circuit 131 to pull down the control voltage $V_C$, which will shift up the level of the output voltage $V_{SET}$ of the difference amplifier circuit 1321, and then the amplifier 1322, the NMOS transistor 1323, the current-setting resistor 1324, the current mirror, the amplifier 1326, and the NMOS transistor 1327 will act in response to increase the regulation current $I_O$. As a result, even the current-setting resistor 1324 has a variance in resistance, the regulation current $I_O$ still can be automatically adjusted to the constant average value of the output current $I_{OUT}$.

Due to the designs mentioned above, the present invention possesses the following advantages:

1. The method for minimizing LED flicker of an LED driver system of the present invention is capable of automatically adjusting a regulation current of a current regulator to an average value of a full-wave-rectified output current of a PFC constant current converter, so as to minimize the ripple of a current flowing through an LED module and thereby eliminate the flicker of the LED module.

2. The method for minimizing LED flicker of an LED driver system of the present invention is capable of making a regulation current equal to an average value of a full-wave-rectified output current of a PFC constant current converter without the need of using a precise current-setting resistor.

While the invention has been described by way of examples and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A method for minimizing LED flicker of an LED driver system, said LED driver system comprising a PFC constant average current converter, a capacitor, an LED module, and a current regulator, wherein said PFC constant average current converter has an input coupled to a full-wave-rectified input voltage and an output providing an output voltage and an output current, both said output voltage and said output current being in phase with said full-wave-rectified input voltage, and said output current having a constant average value; said capacitor is coupled between said output of said PFC constant average current converter and a ground; said LED module has a first end coupled to said output of said PFC constant average current converter and a second end coupled to said current regulator; and said current regulator is coupled between said second end of said LED module and said ground, the current regulator includes a control voltage generation circuit and a variable current source, the method including:

using the control voltage generation circuit of said current regulator connected to said second end of said LED module to generate a control voltage according to an average of a difference between a reference voltage and a voltage at said second end of said LED module, the voltage at said second end of said LED module being in phase with said full-wave-rectified input voltage, and the control voltage being generated to be inversely proportional to an average of the voltage at said second end of said LED module;

using a difference amplifier circuit of said variable current source to determine a regulation value according to said control voltage, wherein the regulation value will become higher as the control voltage gets lower, and the regulation value will become lower as the control voltage gets higher;

using an amplifier circuit and an NMOS transistor of the variable current source connected to said second end of said LED module to generate a current source according to the regulation value;

wherein the control voltage will automatically adjust to a corresponding level in response to the voltage at said second end of said LED module to generate a required value of the regulation value to make the current source equal to the constant average value of the output current under a negative feedback control mechanism of the current regulator that when the current source is higher than the constant average value of the output current, the voltage at said second end of said LED module will be lower than a steady state level, the control voltage will be increasing, and the regulation value will be decreasing to reduce the current source; and when the current source is lower than the constant average value of the output current, the voltage at said second end of said LED module will be higher than the steady state level, the control voltage will be decreasing, and the regulation value will be increasing to increase the current source.

2. The method for minimizing LED flicker of an LED driver system as claim 1, wherein said amplifier circuit includes a resistor, and an amplifier, and said amplifier drives said NMOS transistor to determine said current source.

3. The method for minimizing LED flicker of an LED driver system as claim 1, wherein said current regulator uses a first NMOS transistor, a resistor, an amplifier, and a current mirror to determine said current source.

4. The method for minimizing LED flicker of an LED driver system as claim 1, wherein a source of the NMOS transistor is connected to a first input of the amplifier, a drain of the NMOS transistor is connected to the second end of the LED module, and a gate is connected to an output of the amplifier, and a second input connected to an output of the difference amplifier circuit.

5. The method for minimizing LED flicker of an LED driver system as claim 3, wherein the current mirror includes a second NMOS transistor, a source of the first NMOS transistor is connected to a drain of the second NMOS transistor, an output of the amplifier is connected to the gate of the first NMOS transistor, and an input of the amplifier is connected between the source of the first NMOS transistor and the drain of the second NMOS transistor.

* * * * *